United States Patent Office 3,387,649
Patented June 11, 1968

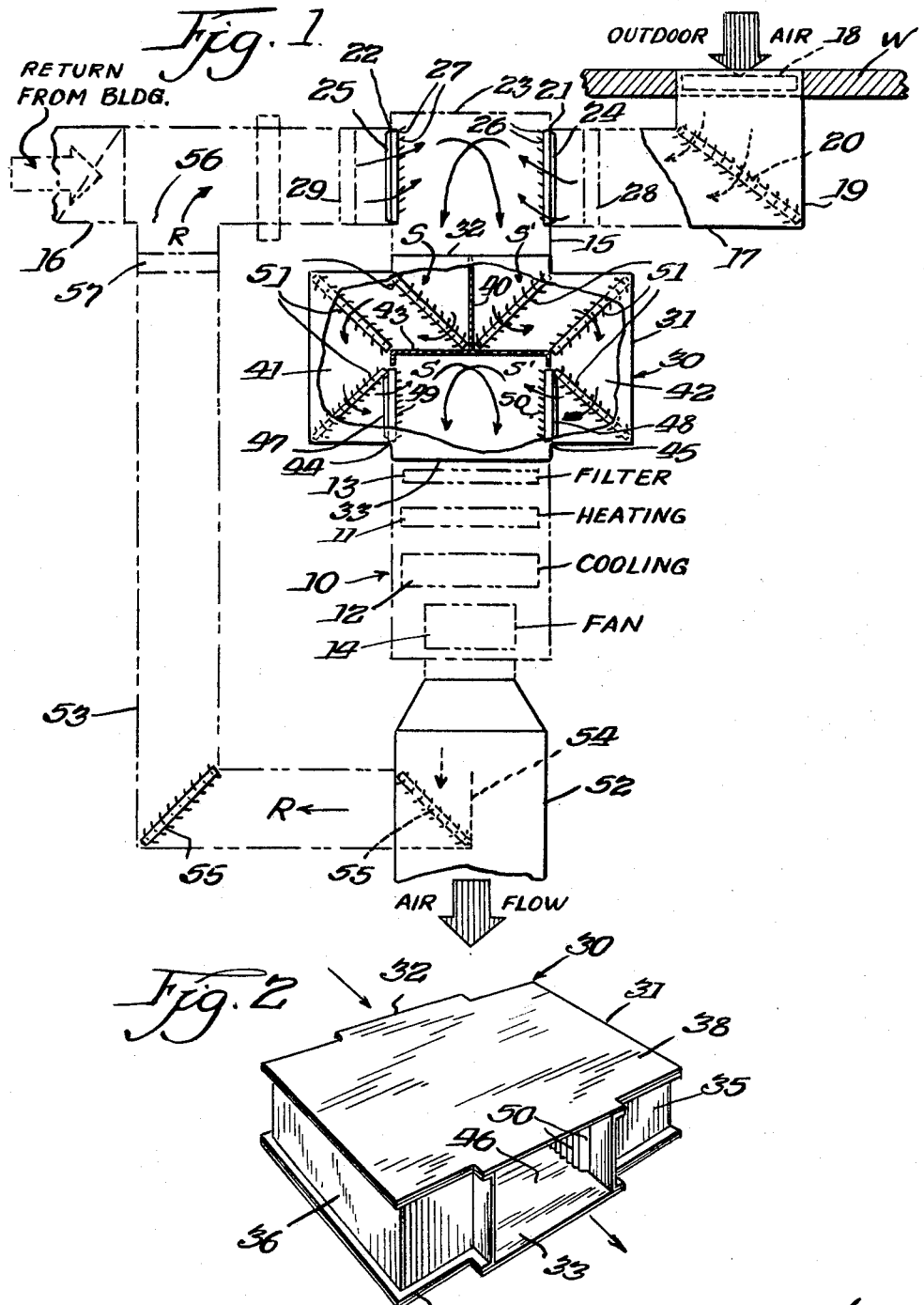

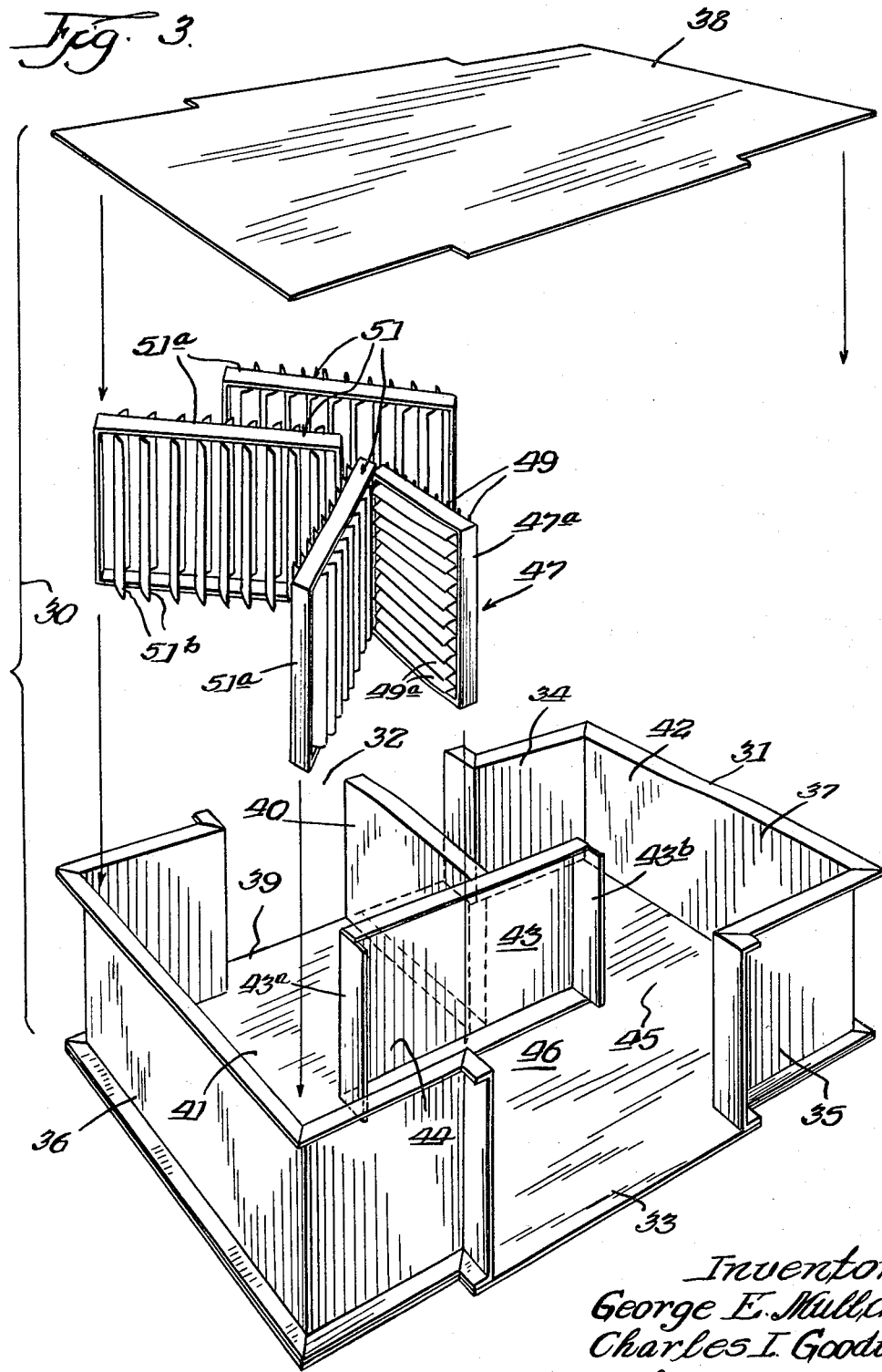

3,387,649
AIR STRATIFICATION ELIMINATOR
George E. Mullins, Champaign, and Charles I. Goodwin, Urbana, Ill., assignors to Brown, Manthei, Davis & Mullins, Inc., Champaign, Ill., a corporation of Delaware
Filed Dec. 27, 1965, Ser. No. 516,479
8 Claims. (Cl. 165—59)

ABSTRACT OF THE DISCLOSURE

A stratification eliminator unit is provided for use in combination with a building heating system having heating coil means subject to freeze-up. The stratification eliminator is in the form of a box for insertion in a duct delivering varying proportions of warm return air and cold outside air to a central heating coil unit, which may also contain cooling coil means subject to freeze-ups. The unit discharges uniformly mixed, non-stratified air to the heating and cooling coils, thereby protecting them from stratified portions of outside air below 32° F.

Background

Building air heating systems utilizing outside air in varying proportions with return building air can, and frequently do, present serious freeze-up problems where the heating coils, cooling coils, or both, are subject to freezing when exposed to air below 32° F. In recent years, this problem has been accentuated by the increasing use of hot water for heating in central fan systems, and the increasing use of chilled water for cooling in place of direct expansion coils. However, steam heating coils may also be subject to freezing, especially steam preheat coils which are upstream of the main air handling unit, and particularly pre-heat coils located in the outside air duct.

Freeze-up incidents of chilled water coils are attributable in part to the desire to have the cooling system in readiness at all times of the year. The water cooling coils may be drained, or winterized with anti-freeze, but this makes the cooling system unavailable on short notice, while some cooling may be desirable on mild days during the normal heating season, or during fall and winter change-over periods where the need for heating and cooling can alternate from day to day.

Central heating systems having maximum-minimum outside air temperatures are particularly subject to freeze-ups. If the outside air temperature is below 32° F., and the thermostat control opens the outside air damper to maximum position, a condition may result where it is difficult to avoid a freeze-up. More generally, a problem exists in central systems in which steam, hot water and idle chilled water coils are subjected to low temperature outdoor air during the winter heating operation. The seriousness and magnitude of the problem is well recognized by heating engineers. See Heating, Piping and Air Conditioning, July 1961, pp. 150–151.

In central heating systems of the type described, some provision is usually made for mixing the low temperature outside air with return building air before the air is delivered to the central air-handling unit which contains the heating and/or cooling coils. However, when two air streams of different temperatures are introduced into the same duct, they have a tendency to resist mixing and to remain stratified due to air velocity and limited time. To add heat to the outside air before delivery to the common duct requires costly equipment, and where steam or water-heating coils are employed for the pre-heating, these coils are also subject to being frozen and broken. Even where pre-heating is used for the outside air, all portions of the incoming air stream may not be equally heated due to stratification or uneven steam distribution in the steam heating coils.

Although the objective is usually to mix return air and outside air in proportions which will provide an average mixed air temperature above freezing, this may lead to a false sense of security. Poor mixing can result in sub-freezing air being drawn into the system even though the average mixed air temperature is theoretically above freezing. This is due to stratification within the air stream. Idle cooling coils, and even active heating coils under certain conditions of operation, may thus freeze up.

When freeze-ups occur, expensive repairs to the heating system may be required, and the system may be out of operation for a considerable period of time, thus causing considerable discomfort and inconvenience to the users of the building. There is also the possibility of serious property damage due to leaking water from the frozen and broken coils. Consequently, it is a general object of the present invention to provide more adequate freeze-up protection for heating and cooling coils of central air heating systems. More specifically, it is an object to provide a stratification eliminator for incorporation in a building air heating system which substantially overcomes the problems and disadvantages described above. Another related object is to provide a stratification eliminator of the character described which can readily be installed in either old or new building air-heating systems at a minimum cost but which at the same time provides effective protection against freeze-ups due to air stratification or improper and incomplete mixing. A related advantage is that air heating systems incorporating the stratification eliminator of the present invention can utilize outside air in varying proportions up to 100% without requiring pre-heating of the outside air by heating coils which themselves might be subject to freeze-up. It is a further object to provide means for producing a more thoroughly mixed non-stratified air stream which facilitates a better control of room temperature. Further objects and advantages will be indicated in the following detailed specification.

Drawings

This invention is shown in an illustrative embodiment in the accompanying drawings, wherein—

FIGURE 1 is a schematic view of a building air-heating system incorporating the air-mixing unit of this invention;

FIG. 2 is a perspective view of the air-mixing unit used in the system of FIG. 1; and FIG. 3 is an exploded perspective view of the air-mixing unit, the parts being shown in separated relation.

Detailed description

Looking first at FIGURE 1, there is illustrated a building air-heating system of the kind which is subject to freeze-ups. The system includes a central air-handling unit 10 which contains heating coils 11 over which the air to be heated is passed. The heating coils may be either hot water or steam coils, and are generally describable as heating coil means subject to freeze-up when exposed to air below 32° F.

In the illustration given, the air-handling unit 11 also includes cooling coils 12. The present invention is particularly advantageous when the cooling coils 12 are chilled water coils which are subject to freeze-up when exposed to air below 32° F. The air-handling unit 10 may also contain a filter 13 and a fan 14. The construction of fan 14 is not critical, and either a single or double intake fan may be used to induce the flow of air over the heating coils 11 and the cooling coils 12.

While the fan means 14 may be located upstream of the heating and/or cooling coils, such as the heating coils 11 and the cooling coils 12, the location illustrated in FIG. 1 is preferred. By having the fan means 14 located downstream of the heating and cooling coils, a more uniform flow of air over the coils may be provided, the air being smoothly drawn through the coils by the suction action of the fan instead of being blown through the coils where the fan is located upstream. Furthermore, with the air-mixing unit of this invention incorporated in the system, the fan does not need to perform any function in mixing the air to provide protection for the coils.

The system also includes an air supply duct or duct means 15 for delivering the air to be heated to the air-handling unit 10, and particularly for flow over the heating and cooling coils 11 and 12. Supply duct 15 is a common duct for the return air and the outside air. The system therefore includes a return air duct or duct means 16 which communicates with duct 15, and an outside air duct or duct means 17 which also communicates with the duct 15.

As indicated in FIG. 1, duct 16 receives return air from the building, while duct 17 extends to an outdoor air inlet 18 in the building wall W. Duct 17 has an elbow or bend at 19 which is equipped with air-turning vanes 20 to direct the air into the section of duct 17 connecting to duct 15.

Preferably, as shown, the inlet 21 from duct 17 to duct 15, and the inlet 22 from duct 16 to duct 15 are provided in oppositely-disposed relation, for example, in the opposite side walls of duct 15. Duct 15 may be provided with a transversely-extending end wall 23 which is located adjacent the air inlets 21, 22. By means of grills 24 and 25 providing inclined blades or vanes 27, the opposed streams of outdoor air and return air may be directed against the inside surface of wall 23 to promote mixing and reverse flow, as indicated by the arrows in FIG. 1. While this pre-mixing of the air stream is desirable, it is not essential because of the incorporation in the system of the air-mixing unit which will be subsequently described.

The relative proportions of the return air and outdoor air supplied to duct 15 may be controlled by automatic dampers. In the illustration given, an air damper 28 is diagrammatically illustrated as being in duct 17 adjacent the coil 24, while damper 29 is located in duct 16 adjacent the grill 25. It will be understood that the dampers 28 and 29 may be regulated automatically, or that they may be set manually.

The fresh air duct 17 is shown as not equipped with any pre-heating means. As indicated above, pre-heating of the outside air is not required when employing the air-mixing unit of this invention, as will now be described in detail.

An embodiment of the stratification eliminator or air-mixing unit of this invention, which is designated generally as 30, is shown in FIGS. 1, 2, and 3. Reference will therefore be made to all of these figures in the following description.

As indicated above, the stratification eliminator 30 is designed for protecting the heating and/or cooling coil means from freezing. For this purpose, stratification eliminator 30 is interposed in the supply duct 15 upstream of the coils, such as the heating coils 11 and the cooling coils 12. As shown more clearly in FIGS. 2 and 3, the unit 30 includes an outer casing 31 which is in the form of a box which encloses an air space. Box 31 has an air inlet opening 32 on its upstream side, and an air outlet opening 33 on its downstream side. In the illustration given, the inlet 32 is provided in front wall 34, while the outlet is provided in the oppositely-disposed rear wall 35. No openings are provided in side walls 36 and 37, nor in top 38 and bottom 39.

The air inlet opening 32 is connected to duct 15 for receiving air through the supply duct from both return air duct 16 and outside air duct 17. The air outlet opening 33 connects to the air handling unit 10 upstream of the heating and cooling coils. Thus, the outlet 33 discharges a mixture of return air and outside air for circulation over the heating and cooling coils.

In accordance with the present invention, an air flow divider means is mounted within box 31 adjacent air inlet opening 32 for separating the incoming air into at least two air streams. As shown, the air divider means may be in the form of vertically-extending partition 40, which extends inwardly from inlet 32 between top 38 and bottom 39. As indicated in FIG. 1, the partition or divider means 40 separates the incoming air into two streams S and S'. Additional partition means is also mounted within the box 31 extending from the divider partition 40 to establish at least two air flow passages 41 and 42. In the illustration given, a partition or baffle 43 (FIGS. 1 and 3) extends in two directions from the inner end of partition 40, respectively, part of the way toward side walls 36 and 42. The partition 43 has outer portions 43a and 43b, which, together with the opposite portions of rear wall 45, provide opposed air outlets 44 and 45 within box 31. The inter-box air outlets 44 and 45 are arranged to respectively discharge the separate air streams S, S" into plenum chamber 46, as indicated more clearly in FIG. 1. As shown, the inter-box air outlets 44 and 45 are constructed and arranged so that the air streams discharge from the passages 41 and 42, converge and intermix within plenum chamber 46 before passing outwardly through air outlet openings 33.

Openings 44 and 45 may be equipped with grills 47 and 48 which have air deflectors or vanes 49 and 50. The side of partition 43 facing outlet 33 may serve as a baffle for the air streams S and S", respectively, directed thereagainst by the vanes 49 and 50. By having the baffle surface provided by the partition 23 spaced inwardly from the opening 33 and located on the far side of the plenum chamber 46, mixing of the air within the plenum chamber is promoted. More specifically, the air streams S and S" may be directed against the baffle 43, and caused to change direction as they intermix, as illustrated by the arrows in FIG. 1.

As shown more clearly in FIG. 3 with respect to the grill 47, the grills 47, 48 and also the grills 24 and 25, may be of the double deflection type. For example, grill 47, in addition to the vertically-extending vanes 49, may also provide horizontally-extending vanes 49a, the vanes 49a being on the upstream side of the grill. Since the construction of double deflection grills is well known, it is not believed it will be necessary to describe it in detail herein. The vanes 49 and 49a may be pivotally mounted within a perimetric frame 47a. The vanes 49 and 49a may be manually or automatically adjustable with respect to their angle or position, and they will usually be adjustable as a group. It will be understood that the upstream side of the grills 50, 24 and 25 may also be provided with horizontally-extending vanes, such as the vanes 49a of grill 47.

The passages 49 and 42, at the corners or angles therein, may be provided with suitable sets of air-turning vanes 51. As shown more clearly in FIG. 3, the sets of air-turning vanes 51 may be in the form of perimetric frames 51a which support the arcuate vanes 51b. As shown more clearly in FIG. 1, the air-turning vane means 51 cooperate with the inter-box outlets 49 and 50 to promote the flow of the air through passages 41 and 42 and to convert the separated air streams S and S" within the plenum chamber 46.

The stratification eliminator 30 may be conveniently constructed from sheetmetal, such as galvanized steel sheets. After being formed by suitable cutting and folding operations, the walls and partition members may be assembled by soldering. Since this type of metal fabrication is well known in the art, it is not believed it will be necessary to describe it herein. It will be understood that the grills 49 and 50 and the turning vanes 51 will be fabricated in the form illustrated in FIG. 3, and then assembled in their respective positions within box 31. The grills and vane assemblies may be held in place by any suitable means, such as soldering or spotwelding. Where desired, the top or bottom wall of the box 31 may be made removable to provide access to the interior of the box for inspection or servicing of the grills and vane assemblies.

In the illustration given, the air-handling unit 10 discharges to the general supply duct 52 of the air-heating system. More specifically, the outlet from fan 14 discharges to the duct 52. The heated air in duct 52 may then be passed through suitable branch ducts to the register outlets within the building.

Under some conditions of operation, it may be desirable to recirculate part of the heated air within duct 52 to duct 15 to be resupplied to the air-handling unit 10. Where such an arrangement is provided, much larger proportions of outside air relative to return air may be supplied to duct 15 up to 100% outside air with no return air.

In the illustration given, a recirculation duct 53 connects to the side of duct 52. A partition or baffle 54 may be provided within duct 52 to pick up the recirculation air stream R. Suitable turning vane assemblies 55 may be provided at the elbows or corners of the duct 53 and the partition extension 54 to promote the flow of air into and through the duct 53. It will be understood that the turning vanes 55 are similar to the assemblies 51 previously described.

Duct 53 communicates with duct 16 through an opening 56. An automatic or manual damper 57 may be provided in duct 53 adjacent the opening 56 to control the volume of recirculated air. Another damper may be provided in duct 16 upstream of the opening 56 for controlling the proportion of return air relative to recirculated air. As indicated, the system may be operated with no return air, duct 15 being supplied with recirculated air from duct 53 and fresh air from duct 17. With this arrangement, it will be desirable to provide an oversized fan within the air-treating unit. For example, fan 14 may have a capacity double that required for the air to be supplied to the building through duct 52. This will permit approximately 50% of the air discharge from fan 14 to be recirculated through the duct 53, providing a 50–50 mixture of recirculated and return air to duct 15 for supply to the stratification eliminator unit 30. By the intermixing of the air streams within the unit 30, the heating and cooling coils 10 and 12 will be protected against freeze-up even though the temperature of the outside air is substantially below 32° F.

The operation of the system including the stratification eliminator unit 30 will be apparent from the foregoing description. It will be appreciated that the system provides effective protection against freeze-ups of the heating and cooling coils within the air-handling unit. Even though there is no pre-heating means within the outdoor air duct 17, and even though the outdoor temperature is substantially below 32° F., the thorough intermixing of the return air and/or recirculated air with the outdoor air will prevent the heating and cooling coils from being exposed to any air below 32° F. The air streams are thoroughly intermixed by the unit 30 and stratification of the cold and hot air from the cold and hot air is substantially eliminated. The desired results are further promoted by the use of the opposed air inlets 21 and 22, and by the inclusion of the recirculation duct 53, although these elements of the system may be omitted while still obtaining many of the advantages of the present invention.

While the stratification eliminator unit 30 has been illustrated as disposed horizontally, under some conditions it may be desirable to have the long axis of the unit extend vertically, or in some other orientation. Under certain extreme conditions, a series of the air-mixing units may be used. For example, one stratification eliminator unit may be disposed horizontally, and a second one vertically. These variations are all intended to be within the scope of the present invention.

While this invention has been described in relation to certain preferred embodiments thereof and many details have been set forth for the purpose of illustration, it will be apparent to those skilled in the art that the invention is susceptible to additional embodiments and that certain of the details described herein can be varied considerably without departing from the basic principles of the invention.

We claim:

1. A stratification eliminator unit for insertion in a heating system air duct, comprising, a box enclosing an air space, said box having front and rear walls connected by side walls, said front wall providing an air inlet opening to said space and said rear wall providing an air outlet opening from said space, air flow divider and partition means mounted within said box in the path of incoming air, said divider and partition means being constructed and arranged to separate said incoming air into two streams and providing two separate air flow passages extending around opposite side portions of said enclosed space, said passages terminating in opposed inter-box outlets positioned adjacent to and extending inwardly from said rear wall air outlet, partition means providing an air-deflecting surface within said box facing said air outlet opening, said surface extending across said box at an intermediate position immediately inward of the inner portions of said inter-box outlets, and air stream directing means mounted within said box adjacent the discharge end portions of each of said separate air passages and cooperating with said inter-box outlets to direct the air streams discharged from said inter-box outlets angularly against said air-deflecting surface in mutually opposed relation, said air-deflecting surface being effective to cause said separate air streams to reverse direction and intermix before discharge through said rear wall outlet.

2. The stratification eliminator unit of claim 1 wherein said air stream directing means comprises deflection grill means mounted in each of said inter-box outlets and providing vanes for directing said air streams in said angularly opposed relation against said air-deflecting surface.

3. The stratification eliminator of claim 2 wherein said deflection grill means are double deflection grill means providing both horizontal and vertical vanes.

4. The stratification eliminator of claim 3 wherein air-turning vane means are provided within said air flow passages to smoothly change the direction of air flow therein around said box side portions for discharge through said inter-box outlets.

5. In a building air heating system of the kind having heat transfer coil means subject to freeze-up, air supply duct means for delivering air to be heated to said coil means, return air duct means for supplying return air from the building to said supply duct means, and outside air duct means for supplying air from outside the building to said supply duct means, a stratification eliminator unit for protecting said heating coil means from freezing interposed in said supply duct means upstream of said heating coil means, comprising: a box enclosing an air space, said box having front and rear walls connected by side walls, said front wall providing an air inlet opening to said space and said rear wall providing an air outlet opening from said space, air flow divider and partition means mounted within said box in the path of incoming air, said divider and partition means being constructed and arranged to separate said incoming air into two streams and providing two separate air flow passages extending around opposite side portions of said enclosed space, said passages terminating in opposed inter-box outlets positioned adjacent to and extending inwardly from said rear wall air outlet, partition means providing an air-deflecting surface within said box facing said air outlet opening, said surface extending across said box at an intermediate position immediately inward of the inner portions of said inter-box outlets, and air stream directing means mounted within said box adjacent the discharge end portions of each of said separate air passages and cooperating with said inter-box outlets to direct the air streams discharged from said inter-box outlets angularly against said air-deflecting surface in mutually opposed relation, said air-deflecting surface being effective to cause said separate air streams to reverse direction and intermix before discharge through said rear wall outlet.

6. The combination of claim 5 wherein said air stream directing means comprises deflection grill means mounted in each of said inter-box outlets and providing vanes for directing said air streams in said angularly opposed relation against said air-deflecting surface.

7. The combination of claim 6 wherein said deflection grill means are double deflection grill means providing both horizontal and vertical vanes.

8. The combination of claim 7 wherein air-turning vane means are provided within said air flow passages to smoothly change the direction of air flow therein around said box side portions for discharge through said inter-box outlets.

References Cited
UNITED STATES PATENTS

| | | | |
|---|---|---|---|
| 2,920,549 | 1/1960 | Freitag et al. | 98—108 X |
| 1,965,078 | 7/1934 | Hewitt et al. | 165—59 |
| 2,880,752 | 4/1959 | Kreuttner | 98—38 |
| 3,179,125 | 4/1965 | O'Day et al. | 98—41 |
| 3,212,424 | 10/1965 | Davis | 165—59 |

FOREIGN PATENTS 364,340 10/1962 Switzerland.

ROBERT A. O'LEARY, *Primary Examiner.*

T. W. STREULE, *Assistant Examiner.*